United States Patent [19]
Tachihara et al.

[11] Patent Number: 6,040,799
[45] Date of Patent: Mar. 21, 2000

[54] BEAM STEERING ANTENNA UNIT

[75] Inventors: Hiroyuki Tachihara, Inzai; Hidemichi Inoue, Inagi; Hiroshi Endo, Tokyo, all of Japan

[73] Assignee: Harada Industry Co., Ltd., Tokyo, Japan

[21] Appl. No.: 09/103,198

[22] Filed: Jun. 23, 1998

[30] Foreign Application Priority Data

Jun. 23, 1997 [JP] Japan ................................. 9-165876

[51] Int. Cl.$^7$ .............................. G01S 5/02; H04B 7/185
[52] U.S. Cl. ...................................... 342/357.06; 342/372
[58] Field of Search .................................. 342/154, 354, 342/357.06, 359, 368, 372

[56] References Cited

U.S. PATENT DOCUMENTS

| | | | |
|---|---|---|---|
| 3,761,933 | 9/1973 | Smalser | 343/740 |
| 4,823,140 | 4/1989 | Shibata et al. | |
| 5,376,941 | 12/1994 | Fukazawa et al. | 342/359 |

FOREIGN PATENT DOCUMENTS

| | | |
|---|---|---|
| 0745867 | 12/1996 | European Pat. Off. |
| 0856905 | 8/1998 | European Pat. Off. |
| 4321805 | 1/1994 | Germany . |
| 2265495 | 9/1993 | United Kingdom . |

*Primary Examiner*—Thomas H. Tarcza
*Assistant Examiner*—Dao L. Phan
*Attorney, Agent, or Firm*—Koda & Androlia

[57] ABSTRACT

The beam steering antenna unit of the present invention is constituted to determine the antenna directivity in the direction of the broadcast tower from which the electric wave currently being received is sent, by carrying out the selective combination of plural antenna elements, and controlling the phase relations between the RF signals of each band received with the above antenna elements based on the objective broadcast station data obtainable from the tuner, broadcast tower position data obtainable from the broadcast tower data base, and the present position information obtainable from the GPS receiver in receiving the FM/AM band, TV band, etc.

2 Claims, 11 Drawing Sheets

BEAM STEERING ANTENNA UNIT

BACKGROUND OF THE INVENTION

The present invention relates to a beam steering antenna unit suitable for a vehicle loaded antenna unit to be loaded for example on an automobile.

FIG. 18 shows a drawing showing the constitution of the windowpane antenna unit 200 for automobile, which is one of the conventional vehicle loaded antennas. In FIG. 18, there are provided, for example, two antenna elements 201, 202 with zigzag arrangements of a copper strip line on the rear windowpane G of automobile. These two antenna elements 201, 202 are the antenna elements which can receive the electric waves in the frequency ranges adaptable to the receiving tuner 203 for FM band (frequency modulation band), AM band (amplitude modulation band), and TV band. These antenna elements 201, 202 are selectively connectable to an FM/AM, TV tuner 203.

Thus, this windowpane antenna unit 200 for automobile is made ready to connect optionally the antenna element necessary for the related receiving tuner, and to receive the data coming in from any direction under nearly same conditions.

The conventional windowpane antenna unit 200 for automobile as described above had the following problems. Though it is usable by selectively connecting the two antenna elements 201, 202, these two antenna elements 201, 202 are provided respectively severally, and their directivity cannot be changed in the unit of the single antenna element. Accordingly, although the above conventional antenna unit is usable for receiving under nearly the same conditions without respect to the direction of the incoming electric wave (non-directivity receiving), it has a drawback of receiving the reflected waves from buildings and the like when the automobile is running in the urban street surrounded by tall buildings or mountainous area. In other words, it has a disadvantage of being susceptible to obstruction by multipass interference.

BRIEF SUMMARY OF THE INVENTION

An object of the present invention is to provide a beam steering antenna unit which sustains less obstruction by multi-pass interference or the like even in the urban street surrounded by tall buildings or mountainous area, and with which good receiving can be made.

To attain the above objects, the beam steering antenna unit according to the present invention has following constructions.

(1) The beam steering antenna unit according to the present invention is characterized by having means for determining the antenna directivity in the direction of the broadcast tower from which the electric wave currently being received is sent, by carrying out the selective combination of plural antenna elements, and controlling the phase relations between the RF (radio frequency) signals of each band received with the above antenna element based on the objective broadcast station data obtainable from the tuner, broadcast tower position data obtainable from the broadcast tower data base, and the present position information obtainable from the receiver of GPS (Global Positioning System) in receiving the FM/AM band, TV band, etc.

(2) The beam steering antenna unit according to the present invention is characterized by being furnished with direction detection unit for detecting the direction of the broadcast tower which is releasing the electric wave which is currently received based on the objective broadcast station data obtainable from the tuner, broadcast tower position data obtainable from the broadcast tower data base, and the present position information obtainable from the receiver of GPS in receiving the FM/AM band, TV band, etc., an antenna directivity determining unit for determining the directivity of the antenna based on the direction detected by the direction determining unit, and a directivity variable operation unit for varying the directivity of the antenna based on the information on the directivity of the antenna determined by the antenna directivity determining unit, and the directivity variable operation unit comprising an antenna element selecting unit for selecting a plurality of antenna elements existing at specified positions out of the plural non-directivity antenna elements arrayed in a specified pitch based on the information on the directivity of antenna and combine (by setting the antenna element interval at for example ¼ wavelength), and a phase relation determining unit for variably determining the phase relations between the RF signals of each band received with the above antenna element selected by the antenna element selecting unit based on the information on the directivity of antenna.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Embodiment

Figure 1:
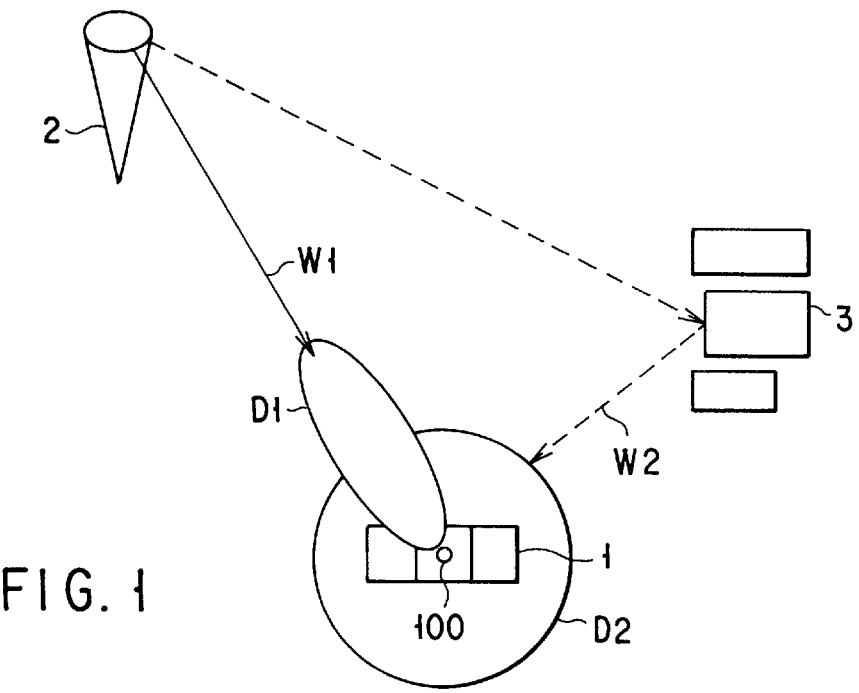
FIG. 1 is a view to show the basic concept of the beam steering antenna unit according to the first embodiment of the present invention.

FIG. 1 is a view showing the basic concept of the beam steering antenna unit according to the first embodiment of the present invention. As shown in FIG. 1, in the beam steering antenna unit 100 equipped on the running vehicle 1, the antenna directivity D1 is actively variable. In other words, the directivity of said antenna is automatically set to be variable so as to have it agree with the direction of the broadcast station 2 (strictly, broadcast tower or sending tower) which issues the electric wave under receipt, thereby making it possible to receive positively the direct wave W1 from the broadcast station 2. For reference, when the directivity is non-directive as in the directivity D2 of conventional type antenna, there is a possibility for receiving the reflected wave W2 of broadcast electric wave on the building 3 or the like in the street of high storied buildings, in addition to the above direct wave W1. In the case of such an antenna, it is unavoidable to have an effect of the multi-path interference, thereby causing significant increment in noise. On the contrary, in the case of the beam steering antenna unit 100 of the present embodiment, there is extremely scarce possibility to have the effect of the above multi-path interference, and receiving of the direct wave W1 only is possible.

Figure 2:
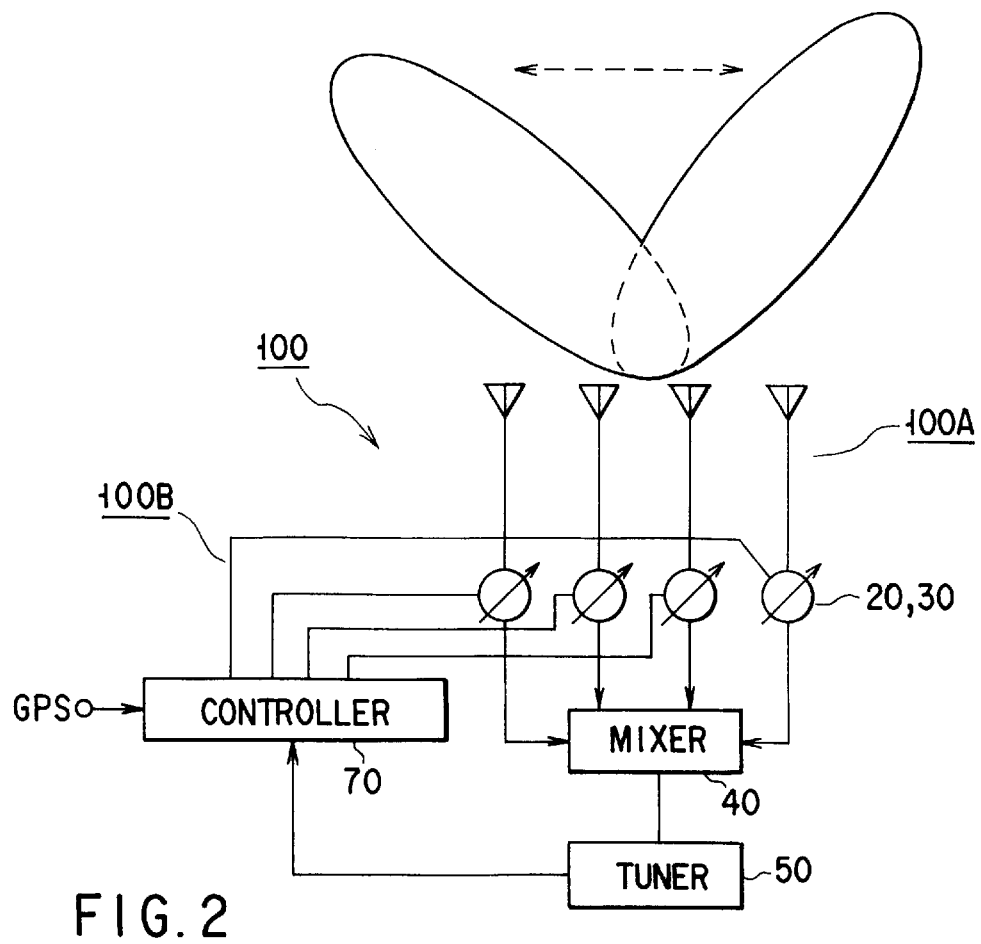
FIG. 2 is a block diagram showing the schematic constitution of the beam steering antenna unit according to the first embodiment of the present invention.

As shown in FIG. 2, the beam steering antenna unit 100 of the present embodiment comprises an antenna unit 100A containing a plurality of antenna elements and a control unit 100B for controlling said antenna unit 100A. The control unit 100B is constituted by a CPU (central processing unit) 70 for antenna control which is to effect the selection of the antenna element groups of the antenna unit 100 or phase control based on the GPS information, operation units 20, 30 for performing selection control or phase control on the plural antenna elements, and a mixer 40 for synthesizing the outputs of all antenna elements and supplying them to the tuner 50.

Figure 3:
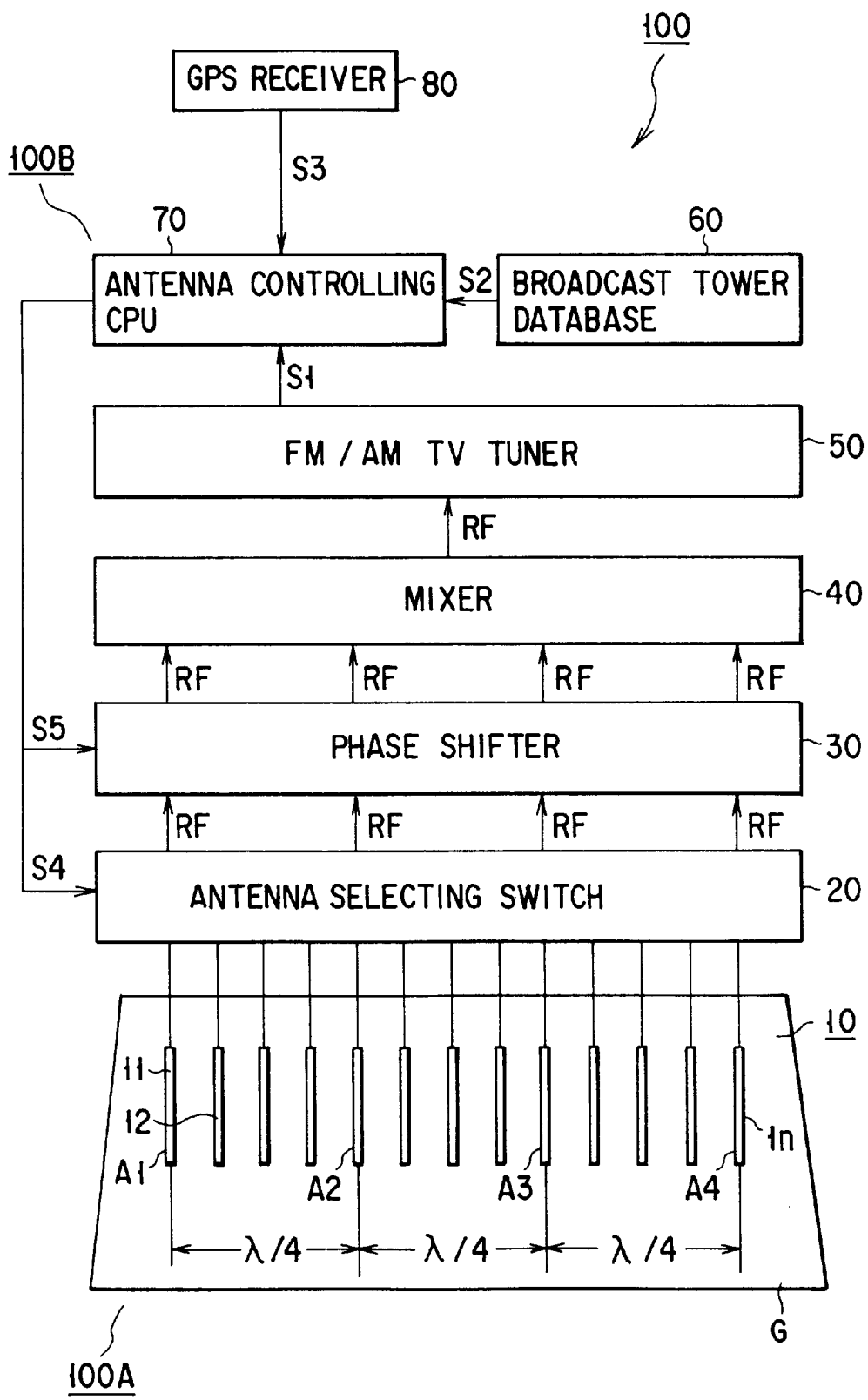
FIG. 3 is a block diagram showing the constitution of the beam steering antenna unit according to the first embodiment of the present invention.

FIG. 3 is a block diagram showing in more detail the constitution of the beam steering antenna unit 100 illustrated in FIG. 2. On the rear windowpane G of an automobile, an antenna 10 is provided. This antenna 10 is made by parallel arrangements of a plurality of non-directivity (vertical polarization) antenna elements 11, 12-1n comprising linear strip lines formed of the material of copper or the like in a horizontal direction at a specified pitch. These antenna elements 11, 12-1n are connected to the plural branch terminal side of the antenna selecting switch 20.

The antenna selecting switch 20 constitutes an antenna element selection unit for obtaining "a receiving antenna having capability to receive the desired electric wave and having a specified directivity". That is to say, through selection by the antenna selecting switch 20 there are selected more than two lines per channel to be offered for receiving (four lines in the present embodiment) of antenna elements A1–A4. The mutual interval between the selected antenna elements A1–A4 is set to be, for example, $\lambda/4$ when the wavelength of the related receiving wave is assumed to be $\lambda$. Because the wavelengths of the received waves are different depending on the kind of the received wave, the prearranged antenna elements 11, 12-1n are provided in a large number of lines so as to assure the above selection to be performed without obstacle.

The four RF signals taken out through the antenna selecting switch 20 are given to the phase shifter 30. This phase shifter 30 effects phase control of the above RF signals so as to make the relative phase positions between the RF signals of waves received through the antenna elements A1–A4 into the predetermined relationship. When the phase relations between the RF signals are variably set to keep the predetermined relationship, the required directivity is obtained.

The respective RF signals whose phases are variably set with the phase shifter 30 are mixed with the mixer 40, after which the RF signals are supplied to the FM/AM, TV tuner 50.

From the FM/AM, TV tuner 50 the data of the broadcast station being currently received, i.e., the data S1 of the objective broadcast station, is outputted. This objective broadcast station data S1 is sent to the antenna controlling CPU 70.

To the above antenna controlling CPU 70 there are supplied the broadcast tower position data S2 from the broadcast tower data base 60 and the present position information S3 from the GPS receiver 80.

In the antenna controlling CPU 70 there is performed an operation for determining the antenna directivity to meet the direction of the broadcast tower which is releasing the electric wave being received at that time based on the given data S1, S2, S3, etc. And, according to the operation result, an antenna element selection signal S4 for selecting the required antenna elements A1–A4 is given to the antenna selecting switch 20. Also, a phase relation setting signal S5 for variably setting the mutual phase relation between the RF signals is given to the phase shifter 30.

Thus, the directivity of the receiving antenna is to be variably set. The factors for varying the directivity are the distance between the selected antenna elements and the mutual phase relation of RF signals obtainable from the antenna elements.

Figure 4:
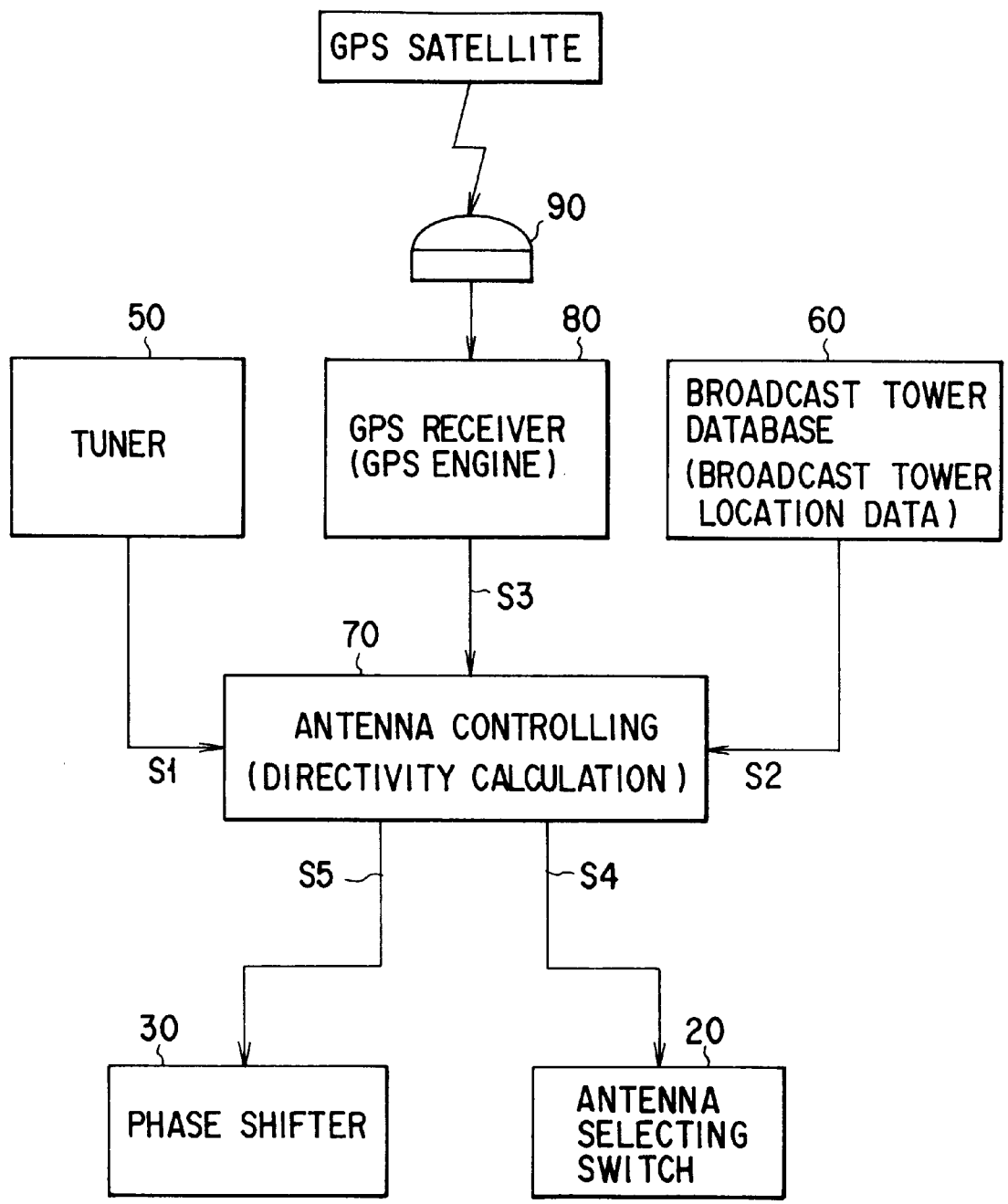
FIG. 4 is a block diagram showing only the control unit of the beam steering antenna unit according to the first embodiment of the present invention by extraction.

FIG. 4 is a block diagram showing only the controller 100B by extraction. As shown in FIG. 4, the GPS receiver 80 is provided with a GPS antenna 90 for receiving the electric wave from the GPS satellite, so that based on the electric wave received with this GPS antenna 90 the present position information S3 can be taken out. As other points are similar to those shown in FIG. 3, their illustration is omitted.

Figure 5:
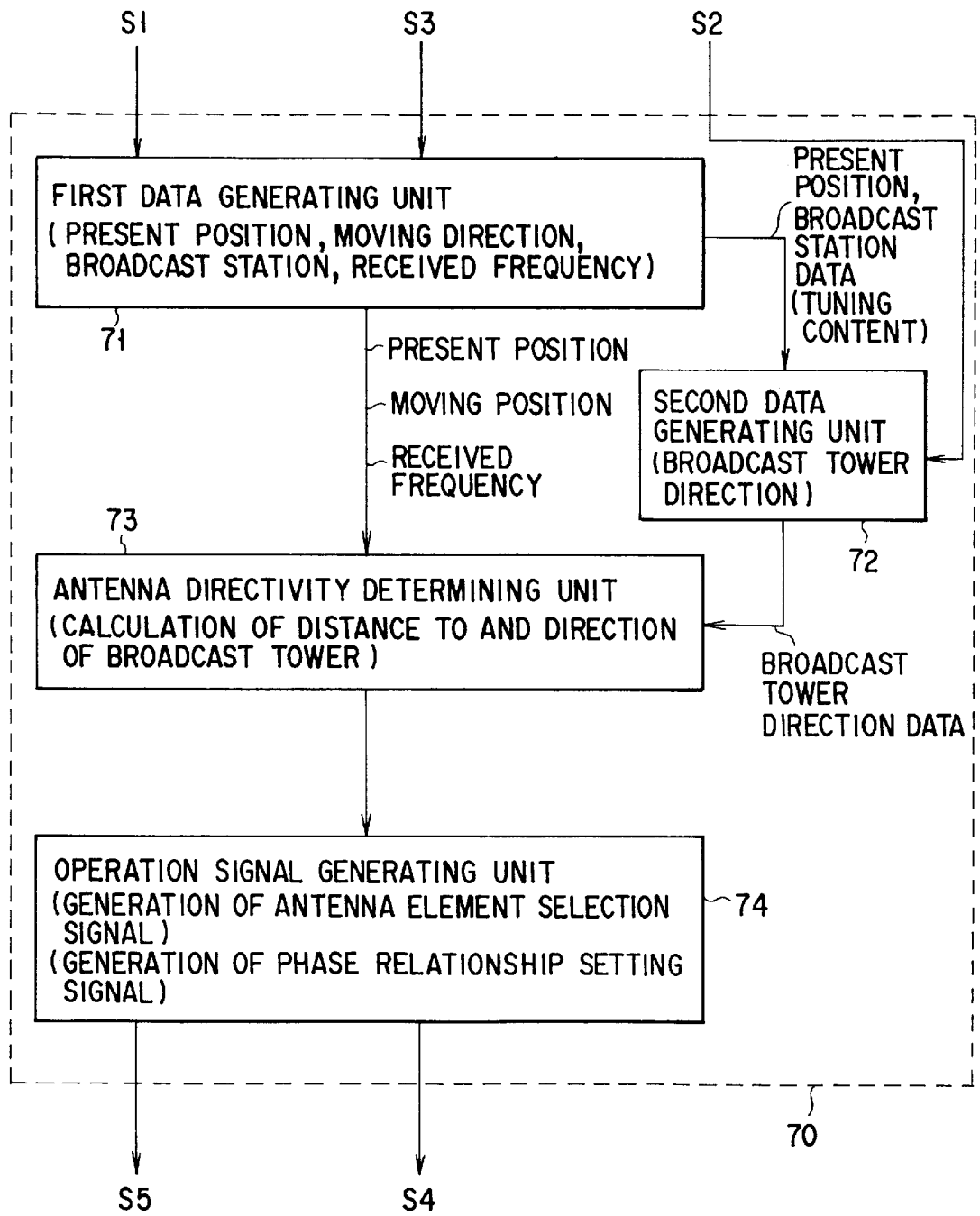
FIG. 5 is a functional block diagram showing the function of the CPU for antenna control of the beam steering antenna unit.

FIG. 5 is a functional block diagram showing the function of the antenna controlling CPU 70. The first data generating unit 71 receives the objective broadcast station data S1 from the tuner 50 and the present position information S3 from the CPS receiver 80 to generate the present position data, driving direction data, broadcast station data, received frequency data, etc. The second data generating unit 72 generates the broadcast tower direction data based on the present position data and broadcast station data inputted from the first data generating unit 71 and the broadcast tower position data S2 inputted from the broadcast tower data base 60.

The antenna directivity determining unit 73 carries out the predetermined operation based on the present position data, moving direction data, and received frequency data inputted from the first data generating unit 71 and the broadcast tower direction data inputted from the second data generating unit 72, to calculate the distance to and direction of broadcast tower. Thus, the antenna directivity most suitable for receiving the direct wave at that time is determined.

The operation signal generating unit 74 generates the antenna element selection signal S4 and phase relation setting signal S5 based on the information relating to the antenna directivity determined at the antenna directivity determining unit 73. The above antenna element selection signal S4 is given to the antenna selecting switch 20, and the above phase control signal S5 is given to the phase shifter 30.

FIG. 6–FIG. 17 are radiation pattern diagrams showing the directivities of the first–fourth antenna elements in the horizontal plane when the positional relations of the first–fourth antenna elements are variably set to the predetermined conditions respectively under the following specified conditions.

Receiving frequency . . . 98 MHz

Antenna element used . . . Non-directivity four antenna elements A1.–A4

Antenna element interval: $\lambda/4$ (=about 750 mm)

Figure 6:
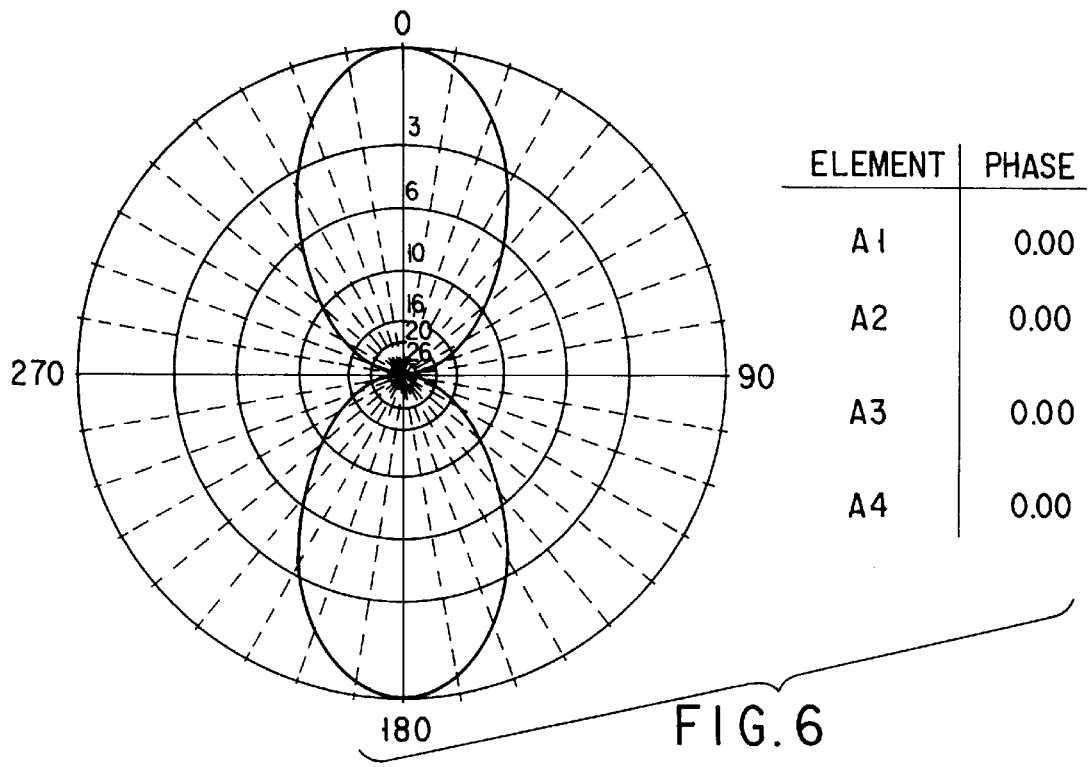
FIG. 6 is a view showing the characteristics of the beam steering antenna unit according to the first embodiment of the present invention, being a radiation pattern diagram showing the directivity at the time when the phase relations of antenna elements are variably set to the first predetermined condition under the specified conditions.

Directions corresponding to forward and backward of automobile: "0–180°" in radiation pattern diagram The positional relations of the antenna elements A1–A4 corresponding to the respective figures (first to twelfth conditions) are summarized in the table forms as follows:

FIG. 6 (1st condition):
    Phase of antenna element A1 . . . 0.00
    Phase of antenna element A2 . . . 0.00
    Phase of antenna element A3 . . . 0.00
    Phase of antenna element A4 . . . 0.00

Figure 7:
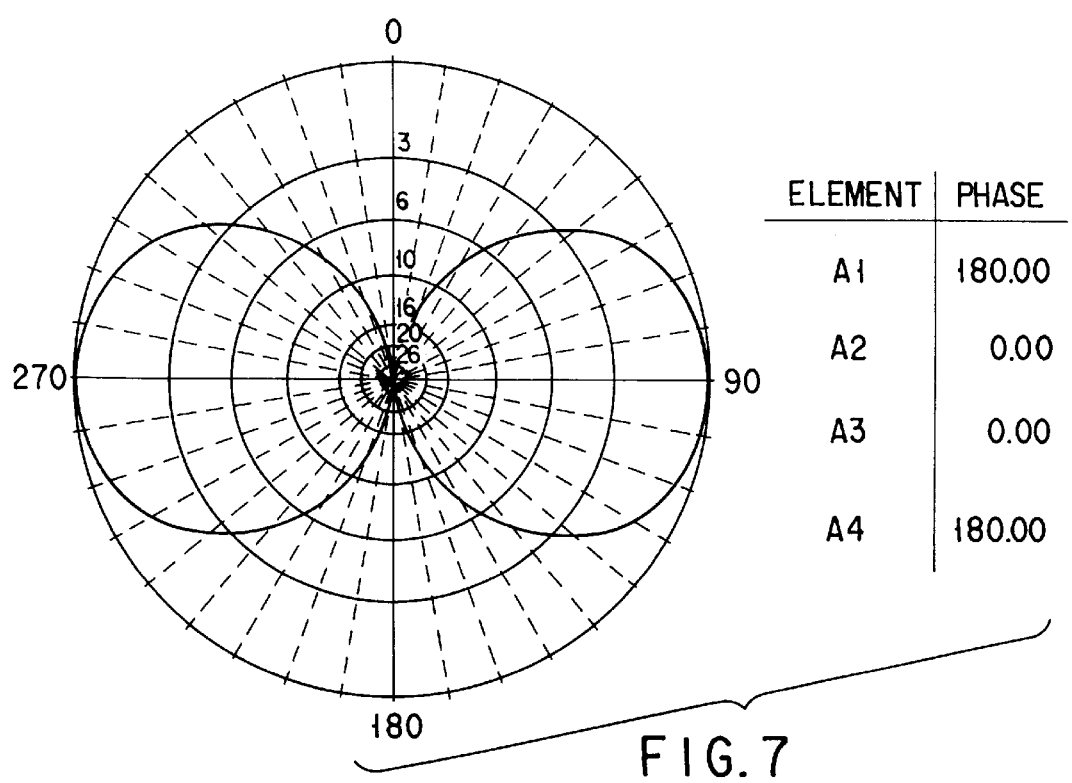
FIG. 7 is a view showing the characteristics of the beam steering antenna unit according to the first embodiment of the present invention, being a radiation pattern diagram showing the directivity at the time when the phase relations of antenna elements are variably set to the second predetermined condition under the specified conditions.

FIG. 7 (2nd condition):
    Phase of antenna element A1 . . . 180.00
    Phase of antenna element A2 . . . 0.00
    Phase of antenna element A3 . . . 0.00
    Phase of antenna element A4 . . . 180.00

Figure 8:
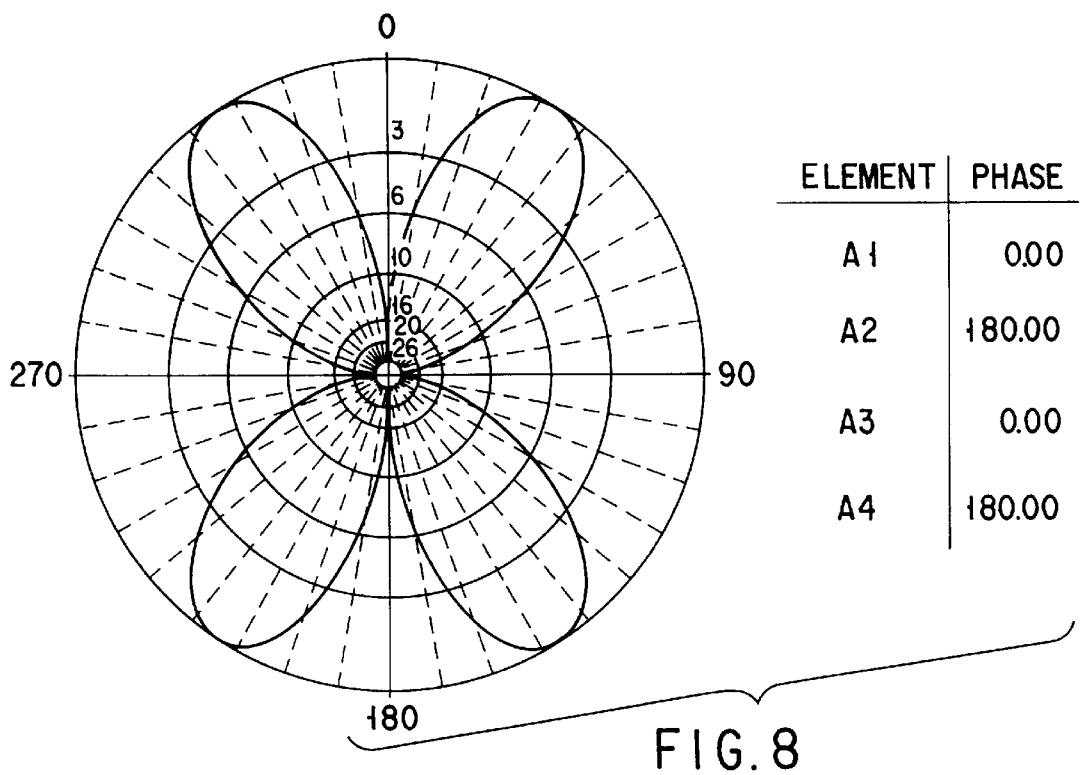
FIG. 8 is a view showing the characteristics of the beam steering antenna unit according to the first embodiment of the present invention, being a radiation pattern diagram showing the directivity at the time when the phase relations of antenna elements are variably set to the third predetermined condition under the specified conditions.

FIG. 8 (3rd condition):
    Phase of antenna element A1 . . . 0.00
    Phase of antenna element A2 . . . 180.00
    Phase of antenna element A3 . . . 0.00
    Phase of antenna element A4 . . . 180.00

Figure 9:
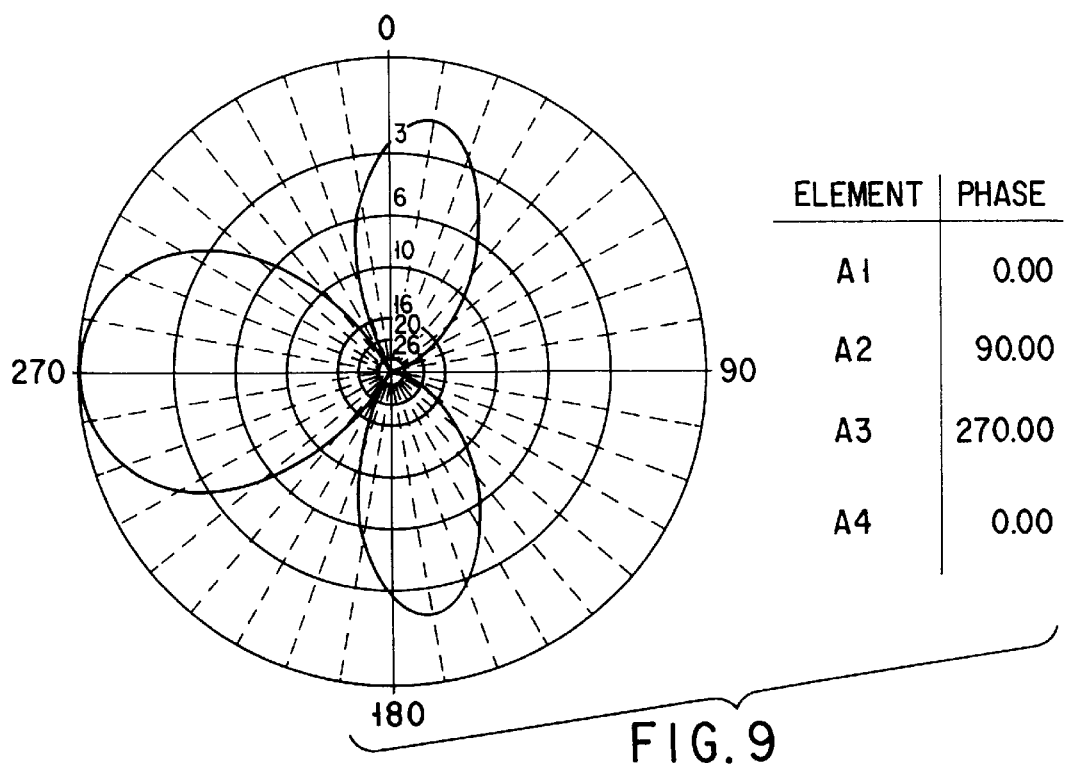
FIG. 9 is a view showing the characteristics of the beam steering antenna unit according to the first embodiment of the present invention, being a radiation pattern diagram showing the directivity at the time when the phase relations of antenna elements are variably set to the fourth predetermined condition under the specified conditions.

FIG. 9 (4th condition):
    Phase of antenna element A1 . . . 0.00
    Phase of antenna element A2 . . . 90.00
    Phase of antenna element A3 . . . 270.00
    Phase of antenna element A4 . . . 0.00

Figure 10:
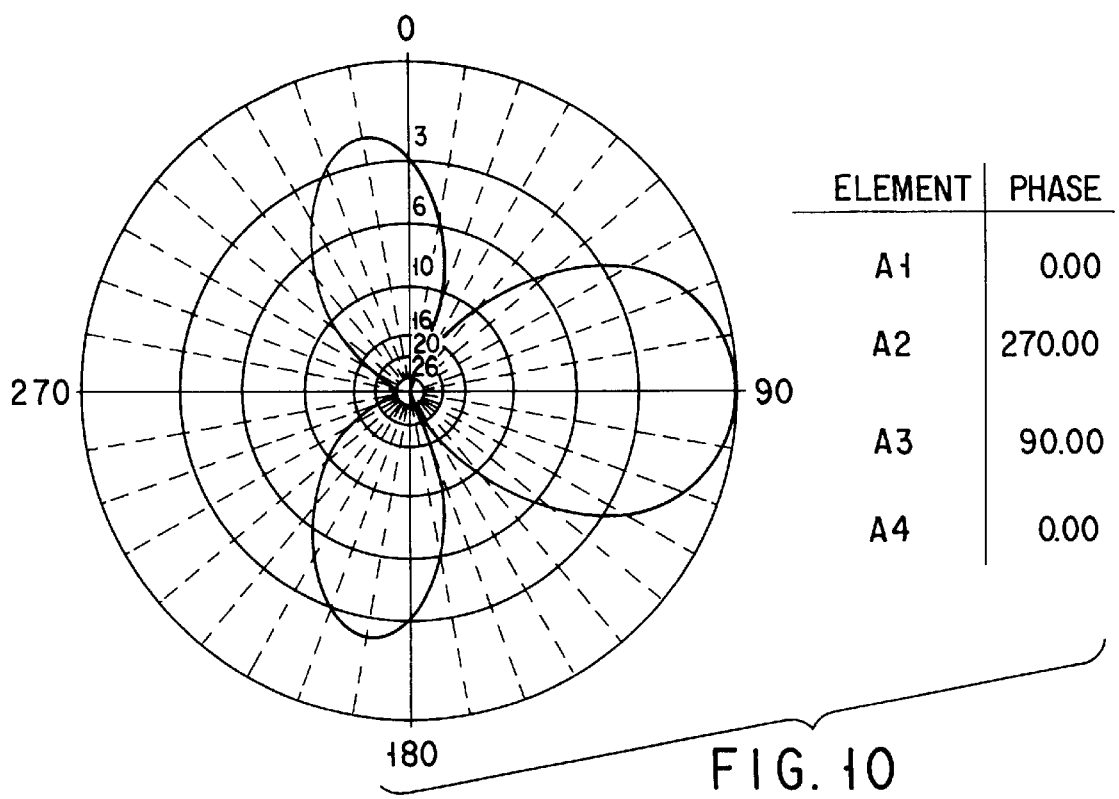
FIG. 10 is a view showing the characteristics of the beam steering antenna unit according to the first embodiment of the present invention, being a radiation pattern diagram showing the directivity at the time when the phase relations of antenna elements are variably set to the fifth predetermined condition under the specified conditions.

FIG. 10 (5th condition):
    Phase of antenna element A1 . . . 0.00
    Phase of antenna element A2 . . . 270.00
    Phase of antenna element A3 . . . 90.00
    Phase of antenna element A4 . . . 0.00

Figure 11:
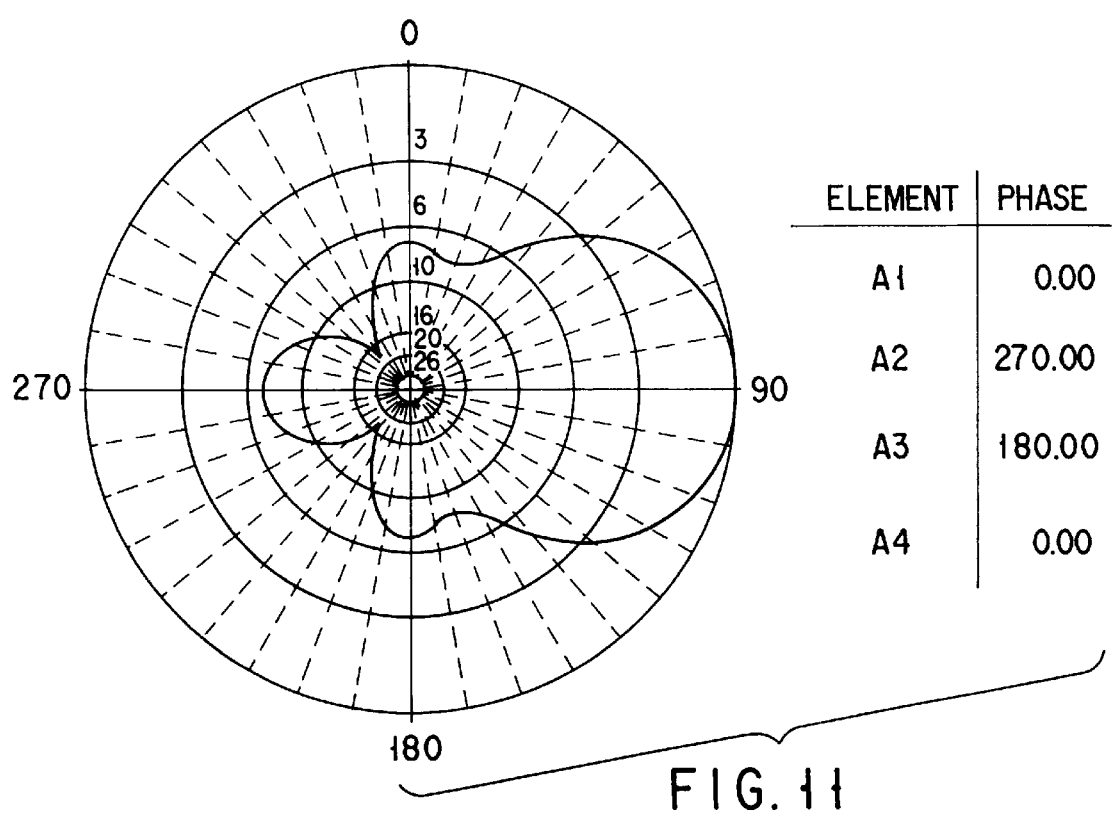
FIG. 11 is a view showing the characteristics of the beam steering antenna unit according to the first embodiment of the present invention, being a radiation pattern diagram showing the directivity at the time when the phase relations of antenna elements are variably set to the sixth predetermined condition under the specified conditions.

FIG. 11 (6th condition):
    Phase of antenna element A1 . . . 0.00
    Phase of antenna element A2 . . . 270.00
    Phase of antenna element A3 . . . 180.00
    Phase of antenna element A4 . . . 0.00

Figure 12:
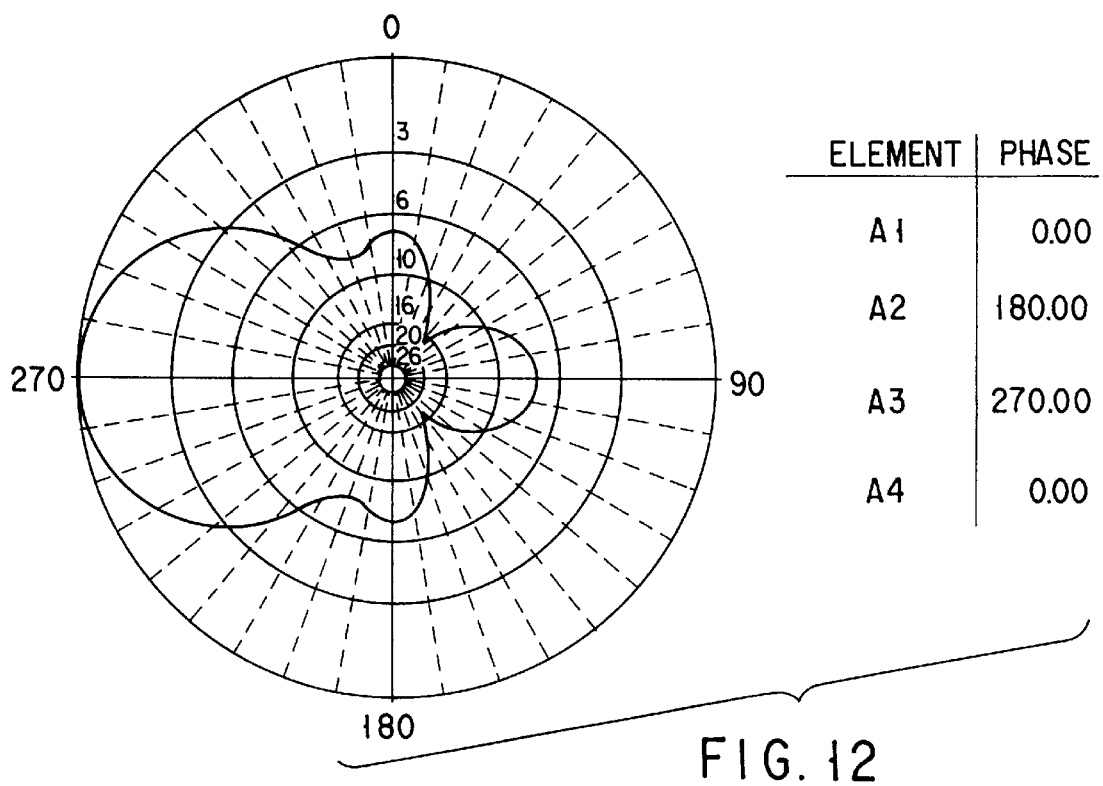
FIG. 12 is a view showing the characteristics of the beam steering antenna unit according to the first embodiment of the present invention, being a radiation pattern diagram showing the directivity at the time when the phase relations of antenna elements are variably set to the seventh predetermined condition under the specified conditions.

FIG. 12 (7th condition):
    Phase of antenna element A1 . . . 0.00
    Phase of antenna element A2 . . . 180.00
    Phase of antenna element A3 . . . 270.00
    Phase of antenna element A4 . . . 0.00

Figure 13:
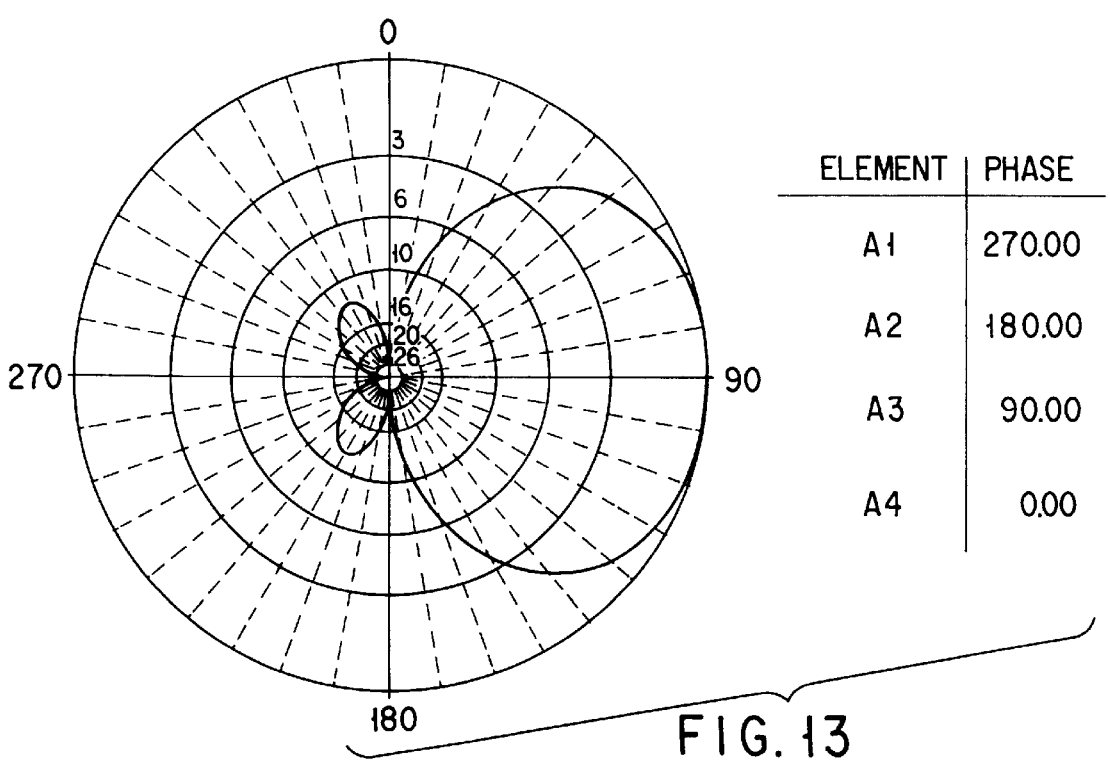
FIG. 13 is a view showing the characteristics of the beam steering antenna unit according to the first embodiment of the present invention, being a radiation pattern diagram showing the directivity at the time when the phase relations of antenna elements are variably set to the eighth predetermined condition under the specified conditions.

FIG. 13 (8th condition):
    Phase of antenna element A1 . . . 270.00
    Phase of antenna element A2 . . . 180.00
    Phase of antenna element A3 . . . 90.00
    Phase of antenna element A4 . . . 0.00

Figure 14:
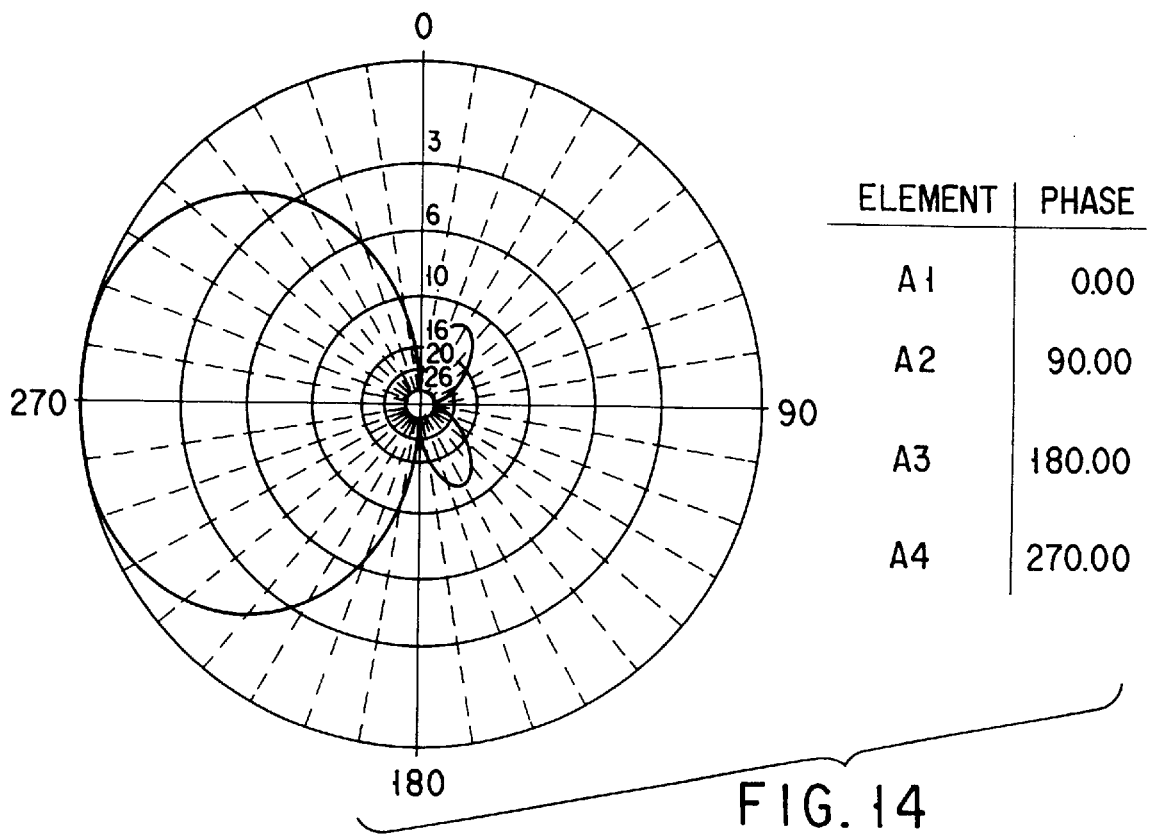
FIG. 14 is a view showing the characteristics of the beam steering antenna unit according to the first embodiment of the present invention, being a radiation pattern diagram showing the directivity at the time when the phase relations of antenna elements are variably set to the ninth predetermined condition under the specified conditions.

FIG. 14 (9th condition):
    Phase of antenna element A1 . . . 0.00
    Phase of antenna element A2 . . . 90.00
    Phase of antenna element A3 . . . 180.00
    Phase of antenna element A4 . . . 270.00

Figure 15:
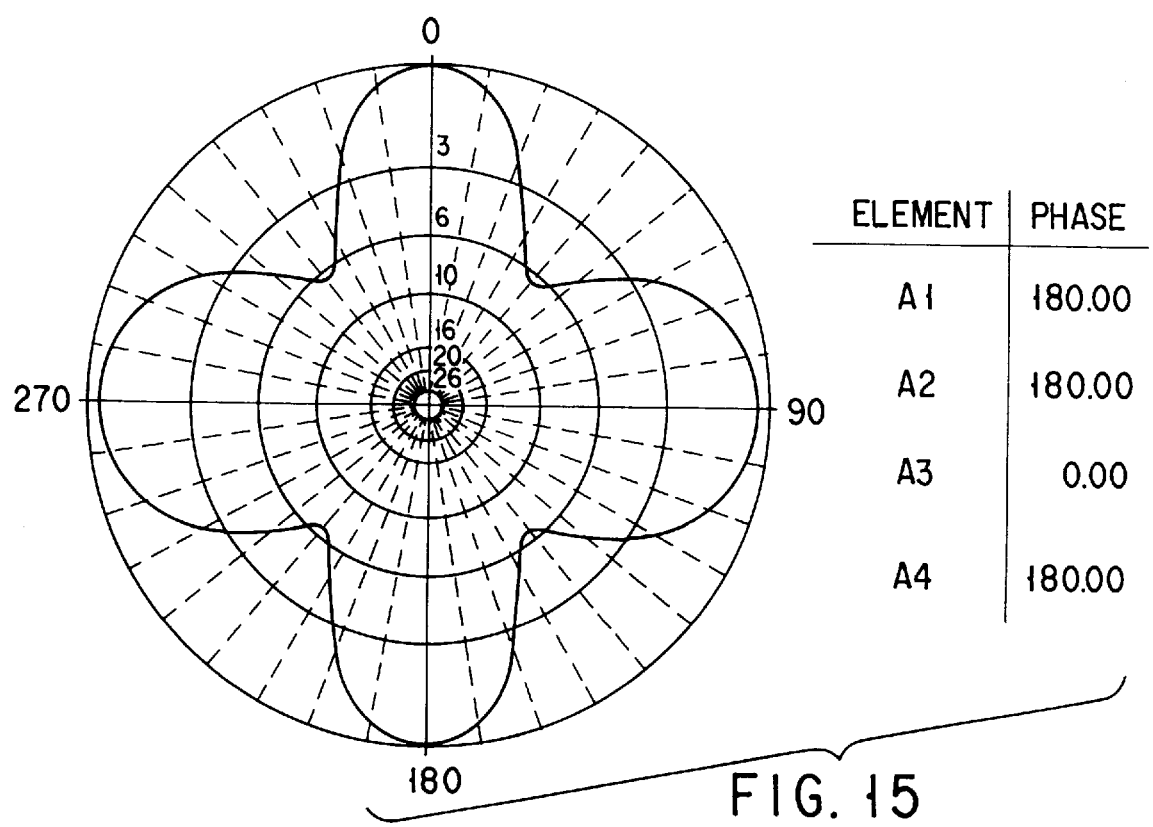
FIG. 15 is a view showing the characteristics of the beam steering antenna unit according to the first embodiment of the present invention, being a radiation pattern diagram showing the directivity at the time when the phase relations of antenna elements are variably set to the tenth predetermined condition under the specified conditions.

FIG. 15 (10th condition):
    Phase of antenna element A1 . . . 180.00
    Phase of antenna element A2 . . . 180.00
    Phase of antenna element A3 . . . 0.00
    Phase of antenna element A4 . . . 180.00

Figure 16:
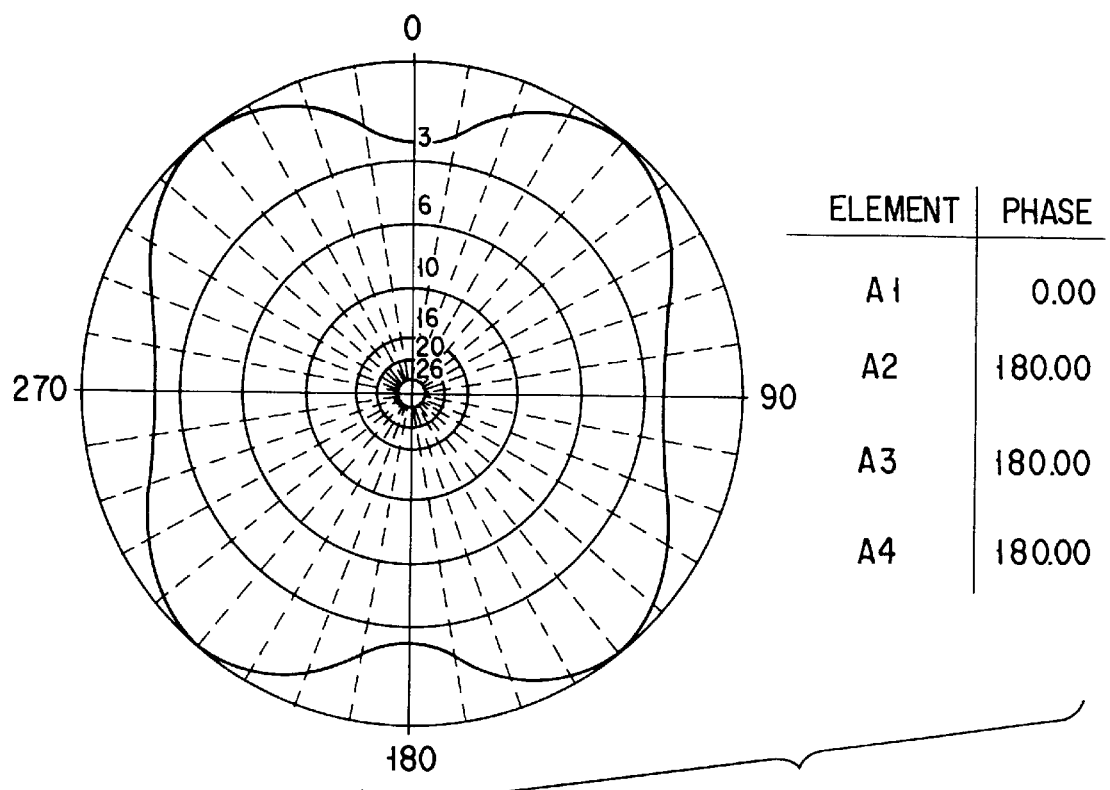
FIG. 16 is a view showing the characteristics of the beam steering antenna unit according to the first embodiment of the present invention, being a radiation pattern diagram showing the directivity at the time when the phase relations of antenna elements are variably set to the eleventh predetermined condition under the specified conditions.

FIG. 16 (11th condition):
  Phase of antenna element A1 . . . 0.00
  Phase of antenna element A2 . . . 180.00
  Phase of antenna element A3 . . . 180.00
  Phase of antenna element A4 . . . 180.00

Figure 17:
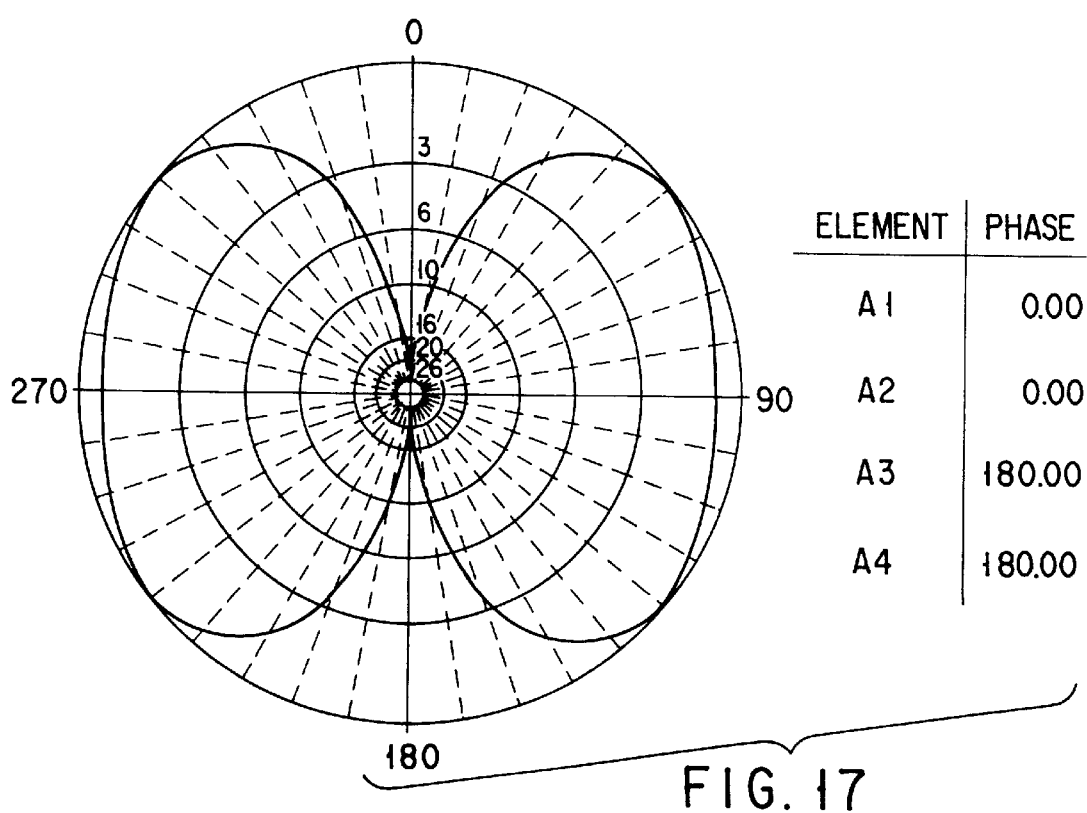
FIG. 17 is a view showing the characteristics of the beam steering antenna unit according to the first embodiment of the present invention, being a radiation pattern diagram showing the directivity at the time when the phase relations of antenna elements are variably set to the twelfth predetermined condition under the specified conditions.
Figure 18:
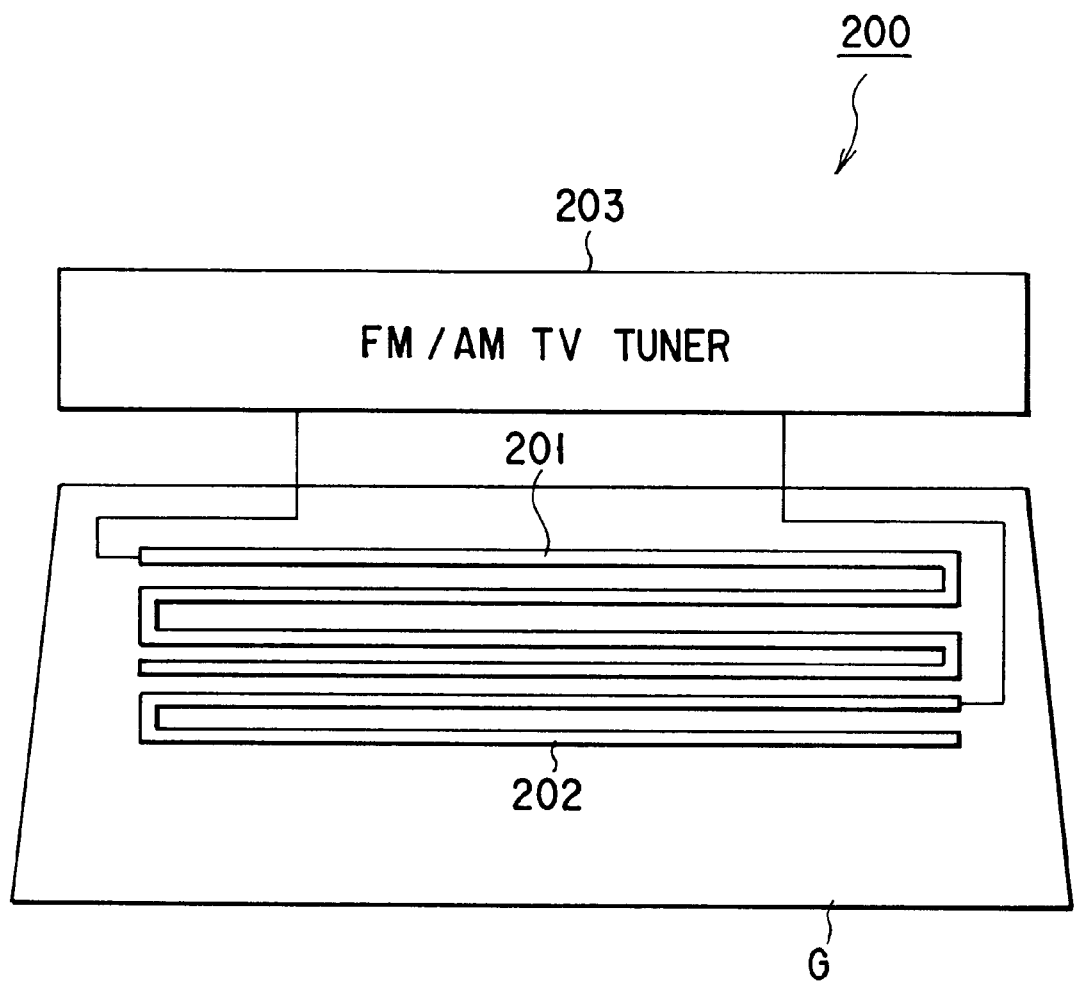
FIG. 18 is a view showing the constitution of a windowpane antenna unit for automobile which is one of the conventional antenna unit for automobile.

FIG. 17 (12th condition):
  Phase of antenna element A1 . . . 0.00
  Phase of antenna element A2 . . . 0.00
  Phase of antenna element A3 . . . 180.00
  Phase of antenna element A4 . . . 180.00

The beam steering antenna unit of the present embodiment acts to recognize the present position of the receiving place by GPS so as to make the direct wave W1 from the broadcast tower positively receivable, it takes out the position of the broadcast tower for FM wave, TV wave, etc. from the data base 60, and variably controls the antenna directivity so as to adapt the antenna directivity automatically to the direction of the broadcast tower which issues the electric wave being currently received. In other words, the beam steering antenna unit of the present embodiment is an active type directivity variable type antenna unit. Thus, the antenna directivity most suitable for receiving the direct wave from the broadcast tower is automatically set, with the result that, regardless of the condition of the receiving area, there is extremely scarce possibility to sustain receiving obstacle under effect of the multi-path interference, and favorable receiving with low noise can be obtained.

Modifications

The beam steering antenna unit according to the embodiment can be modified as follows:

The antenna element is designed to be set to a position else than the window-pane of the automobile.

Additional advantages and modifications will readily occur to those skilled in the art. Therefore, the invention in its broader aspects is not limited to the specific details and embodiment shown and described herein. Accordingly, various modifications may be made without departing from the spirit or scope of the general inventive concept as defined by the appended claims and their equivalents.

What is claimed is:

1. A beam steering antenna unit comprising:

direction detection means for detecting the direction of the broadcast tower which is releasing the electric wave currently being received based on the objective broadcast station data obtainable from the tuner, broadcast tower position data obtainable from the broadcast tower data base, and the present position information obtainable from the receiver of GPS in receiving the FM or AM band, TV band, etc.;

an antenna directivity determining means for determining the directivity of the antenna based on the direction detected by the direction detecting means; and a directivity variable operation means for varying the directivity of the antenna based on the information on the directivity of the antenna determined by the antenna directivity determining means;

said directivity variable operation means comprising:

an antenna element selecting means for selecting a plurality of antenna elements existing at specified positions out of the plural non-directivity antenna elements arrayed in a specified pitch based on the information on the directivity of antenna and combine; and a phase relation determining means for variably determining the phase relations between the RF signals of each band received with the above antenna element selected by the antenna element selecting means based on the information on the directivity of antenna.

2. A beam steering antenna unit comprising:

means for selectively combining a plurality of antenna elements based on objective broadcast station data obtainable from a tuner, broadcast tower position data obtainable from a broadcast tower data base, and present position information obtainable from a GPS receiver in receiving an FM, AM or TV band; and means for determining an antenna directivity in a direction of a broadcast tower which is releasing an electric wave concurrently being received, by controlling a phase relation between RF signals of each band received by the antenna elements.

* * * * *